US012412713B2

(12) United States Patent
Mathae et al.

(10) Patent No.: US 12,412,713 B2
(45) Date of Patent: Sep. 9, 2025

(54) CONTACT ASSEMBLY

(71) Applicant: Hitachi Energy Ltd, Zürich (CH)

(72) Inventors: Jean Louis Gérard Mathae, Ludvika (SE); Per Algot Sundqvist, Smedjebacken (SE)

(73) Assignee: HITACHI ENERGY LTD, Zurich (CH)

(*) Notice: Subject to any disclaimer, the term of this patent is extended or adjusted under 35 U.S.C. 154(b) by 0 days.

(21) Appl. No.: 18/834,332

(22) PCT Filed: Aug. 30, 2023

(86) PCT No.: PCT/EP2023/073841

§ 371 (c)(1),
(2) Date: Jul. 30, 2024

(87) PCT Pub. No.: WO2024/052194

PCT Pub. Date: Mar. 14, 2024

(65) Prior Publication Data

US 2025/0112012 A1 Apr. 3, 2025

(30) Foreign Application Priority Data

Sep. 6, 2022 (EP) .................................... 22194045

(51) Int. Cl.
*H01H 33/664* (2006.01)

(52) U.S. Cl.
CPC ................................ *H01H 33/664* (2013.01)

(58) Field of Classification Search
CPC .. H01H 33/66; H01H 33/664; H01H 33/6606; H01H 2033/6648;

(Continued)

(56) References Cited

U.S. PATENT DOCUMENTS 4,052,577 A 10/1977 Votta
4,219,712 A * 8/1980 Emmerich ........... H01H 33/905 218/60

(Continued)

FOREIGN PATENT DOCUMENTS

CN 1182949 A 5/1988
CN 201352529 Y 11/2009

(Continued)

OTHER PUBLICATIONS

International Search Report and Written Opinion of the International Searching Authority, International Application No. PCT/EP2023/073841, mailed Nov. 6, 2024, 12 pages.

(Continued)

*Primary Examiner* — William A Bolton
(74) *Attorney, Agent, or Firm* — Sage Patent Group

(57) ABSTRACT

A contact assembly including a first contact member electrically connected to a first electrical terminal, a second contact member electrically connected to a second electrical terminal, and a third contact member movable into and out of contact with the second contact member. An elastically deformable fourth contact member ensures electrical contact between the first contact member and the second contact member and the contact assembly is configured such that the fourth contact member is increasingly compressed between respective abutment surfaces of the first contact member and the third contact member as the third contact member moves towards the second contact member, thereby resiliently deforming the fourth contact member. Also, an electrical circuit breaker and an electrical switch, respectively including such a contact assembly. Further, a vacuum interrupter including such an electrical circuit breaker.

11 Claims, 4 Drawing Sheets

(58) Field of Classification Search
CPC ......... H01H 2033/6668; H01H 1/5822; H01H 1/5844; H01H 1/56; H01H 33/18
USPC ........... 218/118, 7, 10, 12, 11, 2; 200/147 R
See application file for complete search history.

(56) References Cited

U.S. PATENT DOCUMENTS

| | | | | |
|---|---|---|---|---|
| 5,889,248 | A * | 3/1999 | Plettner | H01H 33/125 218/7 |
| 8,963,038 | B2 * | 2/2015 | Pope | H01H 50/163 218/93 |
| 12,119,191 | B2 | 10/2024 | Elmiger et al. | |
| 2002/0195425 | A1 | 12/2002 | Perret et al. | |
| 2005/0092713 | A1 * | 5/2005 | Chyla | H01H 33/6606 218/118 |
| 2021/0313127 | A1 * | 10/2021 | Gentsch | H01R 41/02 |

FOREIGN PATENT DOCUMENTS

| | | | |
|---|---|---|---|
| CN | 110582826 | A | 12/2019 |
| EP | 1271590 | A1 | 1/2003 |
| JP | 6622188 | B2 | 12/2019 |

OTHER PUBLICATIONS

Chinese Office Action, Chinese Patent Application No. 2023800444141, mailed Mar. 13, 2025, 6 pages.

Korean Decision for Grant, Korean Patent Application No. 10-2024-7030260, mailed Jul. 23, 2025, 5 pages.

* cited by examiner

CONTACT ASSEMBLY

CROSS-REFERENCE TO RELATED APPLICATIONS

This application is a 35 U.S.C. § 371 national stage application of PCT International Application No. PCT/EP2023/073841 filed on Aug. 30, 2023, which in turn claims priority to European Patent Application No. 22194045.5, filed on Sep. 6, 2022, the disclosures and content of which are incorporated by reference herein in their entireties.

TECHNICAL FIELD

The present disclosure relates to a contact assembly for an electrical circuit breaker or for an electrical switch.

BACKGROUND

Electrical circuit breakers, such as vacuum interrupters, often comprise electrical contacts, at least one of which is movable relatively the other to open and close a gap in order to make or break electrical contact. Each movable electrical contact is typically electrically connected to a respective electrical terminal fixed to a frame or housing of the electrical circuit breaker and the electrical connection between the movable electrical contact and the fixed terminal enabled using a flexible electrical cable terminated with cable lugs fixed to electrical terminals or to a frame using nuts, washers and/or bolts. The use of such cable introduces the number of components required for the electrical circuit breaker. Also, the cables tent to wear out and break over time leading to contamination of surrounding electrical components and eventually to failure of the electrical circuit breaker.

SUMMARY

In some embodiments, an object of the present disclosure is to provide an improved contact assembly for an electrical switch or for an electrical circuit breaker, enabling a compact design with fewer parts, reduced wear and lower risk of failure.

According to a first aspect of the present disclosure, this and other objects is achieved by a contact assembly as defined in appended independent claim 1. Alternative embodiments are defined in the dependent claims.

The contact assembly comprises a first contact member electrically connected to a first electrical terminal by means of an electrical cable, by the first contact member being integrally formed with the first electrical terminal or by the first contact member being directly connected to the first electrical terminal. The contact assembly further comprises a second contact member electrically connected to a second electrical terminal. The contact assembly also comprises a third contact member guided for movement along a first longitudinal axis between at least a first contacting position in which the third contact member physically contacts the second contact member, and a non-contacting position in which the third contact member is physically spaced apart from the second contact member by movement of the third contact member a first predetermined distance along the first longitudinal axis away from the first contacting position. The contact assembly further comprises an elastically deformable and electrically conductive fourth contact member provided between a first abutment surface of the first contact member and a second abutment surface of the third contact member.

The first abutment surface and the second abutment surface are configured such that a distance between the first abutment surface and the second abutment surface increases when the third contact member is moved in a direction along the first longitudinal axis away from the second contact member, and such that the distance between the first abutment surface and the second abutment surface decreases when the third contact member is moved in a direction towards the second contact member. Also, the fourth contact member is configured such that the fourth contact member physically contacts both the first abutment surface and the second abutment surface at least when the third contact member is in the first contacting position.

The second contact member and the third contact member are movable relatively each other to make or break electrical contact between each other depending on their relative position. The relative movement between the second contact member and the third contact member is enabled by the movability of the third contact member along the first longitudinal axis. Electrical contact between the first electrical terminal and the third contact member is established through the first contact member and the fourth contact member. By providing the first abutment surface of the first contact member and the second abutment surface of the third contact member such that the distance between them varies with movement of the third contact member, is possible to establish electrical contact between the first abutment surface and the second abutment surface by means of a varying degree of compression of the elastically deformable fourth contact member, substantially without a need for a gliding motion between the fourth contact member and the respective abutment surfaces. By mitigating gliding between the fourth contact member and the abutment surfaces, wear of the contact assembly is reduced. Also, the size of the contact member can be reduced to only fill the gap required between the first abutment surface and the second abutment surface to enable electrical isolation between the second contact member and the third contact member when the third contact member is in its non-contacting position. This enabled a compact design of the contact assembly, and hence of a breaker or switch in which the contact assembly is used.

The third contact member may comprise a protrusion surrounded by a circumferential shelf forming the second abutment surface, wherein the fourth contact member is a ring arranged around the protrusion.

The ring rests on the circumferential shelf when biased between the first contact member and the third contact member and the provision of the fourth contact member in the form of a ring around a protrusion provides for improved positioning of the fourth contact member and an even loading and deformation of the contact member as the third contact member moves relatively the first contact member.

The ring may be a closed ring.

Although the ring could be formed with a gap, i.e., not a closed ring, it is advantageous to provide a closed ring, since it improves distribution of force around the ring at compression of the ring, and promotes uniform deformation of the ring, thus reducing tendency of gliding motion between the ring and the first and second abutment surface, respectively, since the closed ring has no free ends.

The ring may comprise a coil spring. The provision of a ring in the form of a coil spring provides a high number of points or regions of contact between the ring the first and second abutment surface, respectively. The provision of more contact points/regions reduces the risk of poor electrical contact and reduces the risk of local arcing, thus reducing wear and contamination of the contact assembly.

Although coil springs are widely used to provide a resiliency along the longitudinal extent of the coil spring, it should be understood that the "coil spring" referred to herein is designed to be compressible transversely to the longitudinal extent of the coil spring. In fact, the term 'coil spring' could alternatively be replaced with the term "resilient member comprising a wire wound to form a plurality of windings around a central path of the resilient member". The wire is wound similar to a helical winding of a standard coil spring, but the cross-sectional shape of each winding could be varied, as for example shown in FIGS. 6-9.

The coil spring may comprise a wire formed to windings wound such that the coil spring has a cross section with a first ridge portion facing the first abutment surface, and a second ridge portion facing the second abutments surface. The first ridge portion is radially offset from said second ridge portion with respect to the first longitudinal axis. The radial offset between the first ridge portion and the second ridge position makes it easier to deform the fourth contact member due to an increased momentum on each winding caused by the radial offset.

The coil spring may comprise a wire formed to windings wound a such that the coil spring has a substantially rhomboid cross-sectional shape with rounded corners.

The rhomboid cross-sectional shape provides substantially straight portions of wire of each winding. The substantially straight portions enable a greater contact surface between the abutment surfaces and therefore reduces the risk of poor electric contact and reduces the risk of local arcing, thus reducing wear and contamination of the contact assembly. The rhomboid cross-sectional shape enables easier deformation of the fourth contact member.

Each winding may comprise two substantially straight parallel first wire portions, and two substantially straight parallel second wire portions inclined relatively the first wire portions, said first wire portions facing the first abutment surface and the second abutment surface, respectively.

The contact assembly may further comprise a fifth contact member electrically connected to a third electrical terminal. The third contact member is movable along said first longitudinal axis away from said first contacting position a second predetermined distance past the non-contacting position to a second contacting position in which the third contact member physically contacts the fifth contact member. The fourth contact member is biased between the first contact member and the third contact member through the whole range of movement from the first contacting position to the second contacting position.

The first contact member may comprise a cylindrical body with a central through opening. Also, the third contact member may comprise a protrusion extending through the central through opening of the first contact member.

According to a second aspect of the present disclosure, it is suggested to provide an electrical circuit breaker comprising the above-described contact assembly.

According to a third aspect of the present disclosure, it is suggested to provide an, or an electrical circuit maker comprising the above-described contact assembly.

According to a fourth aspect of the present disclosure, it is suggested to provide an electrical switch comprising the above-described contact assembly comprising a fifth contact member.

According to a fifth aspect, it is suggested to provide a vacuum interrupter comprising the above-described electrical circuit breaker.

The above aspects, accompanying claims, and/or examples disclosed herein above and below may be suitably combined with each other as would be apparent to anyone of ordinary skill in the art.

BRIEF DESCRIPTION OF DRAWINGS

In FIG. 1, the contact assembly is in a first contacting position with electrical contact between the first electrical terminal and the second electrical terminal. In FIG. 2, the contact assembly is in a non-contacting position with no electrical contact between the first electrical terminal and the second electrical terminal. In FIG. 3, the contact assembly is in a second contacting position with electrical contact between the first electrical terminal and the third electrical terminal. Hence, FIGS. 1-3 shown an embodiment of the contact assembly useful in an electrical switch. In other embodiments, the third electrical terminal and the fifth contact member could alternatively be omitted, wherein the contact assembly would rather be useful in an electrical circuit breaker.

DETAILED DESCRIPTION

With reference to the appended drawings, below follows a more detailed description of embodiments of the present disclosure cited as examples.

As mentioned above, an object of the present disclosure is to provide an improved contact assembly 1 for an electrical switch or for an electrical circuit breaker, enabling a compact design with fewer components, reduced wear and lower risk of failure.

Figure 1:
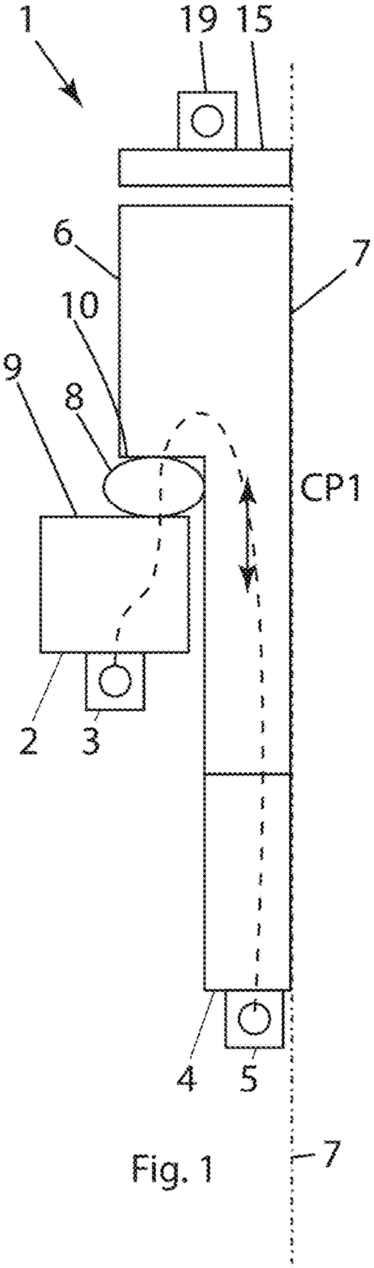
FIGS. 1-3 show cross-sectional schematic views of a first embodiment of a contact assembly according to the present disclosure.
Figure 2:
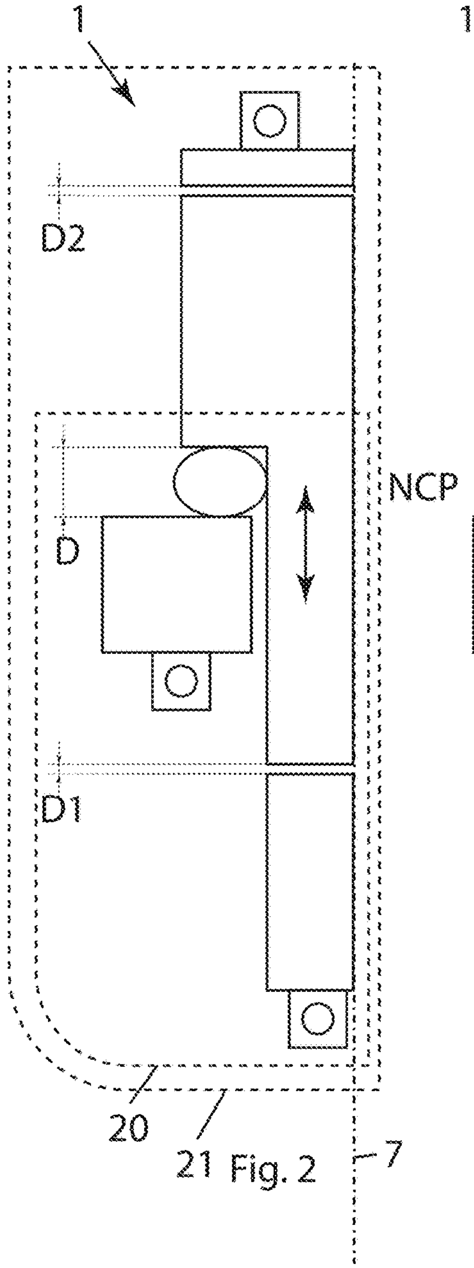
Figure 3:
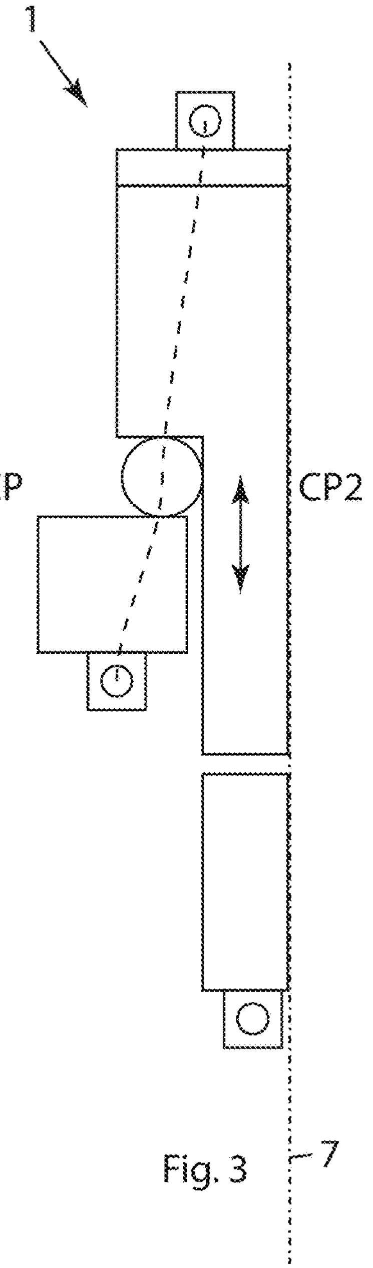

This and other objects are achieved by a contact assembly 1 according to the exemplary embodiment described below, also shown in FIGS. 1-3.

The contact assembly 1 comprises a first contact member 2 electrically connected to a first electrical terminal 3 by means of an electrical cable, by the first contact member 2 being integrally formed with the first electrical terminal 3 or by the first contact member 2 being directly connected to the first electrical terminal 3. The contact assembly 1 further comprises a second contact member 4 electrically connected to a second electrical terminal 5. The contact assembly 1 also comprises a third contact member 6 guided for movement along a first longitudinal axis 7 between at least a first contacting position CP1 in which the third contact member 6 physically contacts the second contact member 4, and a non-contacting position NPC in which the third contact member 6 is physically spaced apart from the second contact member 4 by movement of the third contact member 6 a first predetermined distance D1 along the first longitudinal axis 7 away from the first contacting position CP1. The first predetermined distance D1 should be chosen large enough to provide electrical insulation when the third contact member is in the non-contacting position NCP. The contact assembly 1 further comprises an elastically deformable and electrically conductive fourth contact member 8 provided between a first abutment surface 9 of the first contact member 2 and a second abutment surface 10 of the third contact member 6.

The first abutment surface 9 and the second abutment surface 10 are configured such that a distance between the first abutment surface 9 and the second abutment surface 10 increases when the third contact member 6 is moved in a direction along the first longitudinal axis 7 away from the second contact member 4, and such that the distance between the first abutment surface 9 and the second abutment surface 10 decreases when the third contact member 6 is moved in a direction towards the second contact member 4. Also, the fourth contact member 8 is configured such that the fourth contact member 8 physically contacts both the first abutment surface 9 and the second abutment surface 10 at least when the third contact member 6 is in the first contacting position CP1. The second contact member 4 and the third contact member 6 are movable relatively each other to make or break electric contact between each other depending on their relative position. The relative movement between the second contact member 4 and the third contact member 6 is enabled by the movability of the third contact member 6 along the first longitudinal axis 7 but in this embodiment, the second contact member 4 is fixed. Electrical contact between the first electrical terminal 3 and the third contact member 6 is established through the first contact member 2 and the fourth contact member 8. By providing the first abutment surface 9 of the first contact member 2 and the second abutment surface 10 of the third contact member 6 such that the distance between them varies with movement of the third contact member 6, is possible to establish electrical contact between the first abutment surface 9 and the second abutment surface 10 by means of a varying degree of compression of the elastically deformable fourth contact member 8, substantially without a need for a gliding motion between the fourth contact member 8 and the respective abutment surfaces. By mitigating gliding between the fourth contact member 8 and the abutment surfaces, wear of the contact assembly 1 is reduced. Also, the size of the contact member can be reduced to only fill the gap required between the first abutment surface 9 and the second abutment surface 10 to enable electric isolation between the second contact member 4 and the third contact member 6 when the third contact member 6 is in its non-contacting position NPC. This enabled a compact design of the contact assembly 1, and hence of a breaker or switch in which the contact assembly 1 is used.

Any suitable electrically conducting material may be used for the fourth contacting member 8. Also, any suitable design may be used for the fourth contact member 8 as long as the design provides the resiliency and elasticity required to enable enough contact pressure on the first abutment surface 9 and on the second abutment surface 10 to provide good electrical contact between the fourth contact member 8 and the first 2 and third 6 contact members, respectively, whilst also enabling the third contact member 6 to travel at least the first predetermined distance D1. Such a material could be steel, copper or some suitable metal alloy.

Although the illustrated embodiment further comprises a fifth contact member 15 and a third terminal 19, enabling use of the contact assembly in an electrical switch, the fifth contact member 15 and the third electric terminal 19 could alternatively in other embodiments discussed herein be omitted if the contact assembly 1 is only to be used as an electrical circuit breaker.

The first 9 and second 10 abutment surfaces could have any suitable shape, such as planar of curved, as long as the distance D varies between the first abutment surface 9 and the second abutment surface 10 as described above. Although the embodiments schematically illustrated have first and second abutment surfaces 9, 10 being planar and directed perpendicularly to the first longitudinal direction 7, it should be understood that the orientation of the first abutment surface 9 and of the second abutment surface 10 could be varied. For example, the first 9 and second 10 abutment surfaces could be arranged inclined with respect to the longitudinal axis. However, the abutment surfaces 9, 10 should not be parallel to the first longitudinal axis since this sliding between the contact member 8 and the respective abutment surface 9, 10 should be avoided in order to mitigate wear of the fourth contact member 8 and of the respective abutment surface 9, 10, which would lead to contamination due to particles worn off.

Figure 4:
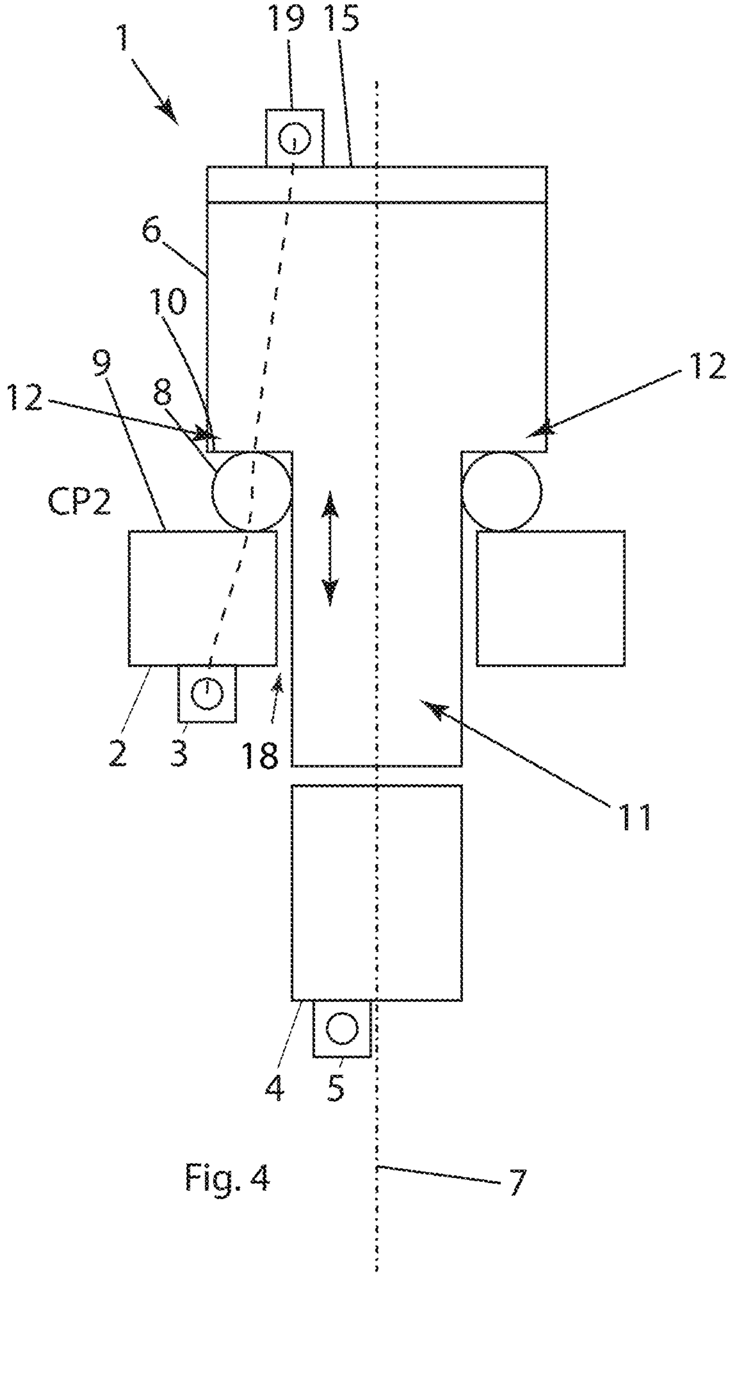
FIG. 4 shows a cross-sectional schematic view of an alternative embodiment of the contact assembly shown in FIGS. 1-3. This contact assembly is substantially axisymmetric about a first longitudinal axis but otherwise corresponds to the one of FIGS. 1-3.
Figure 5:
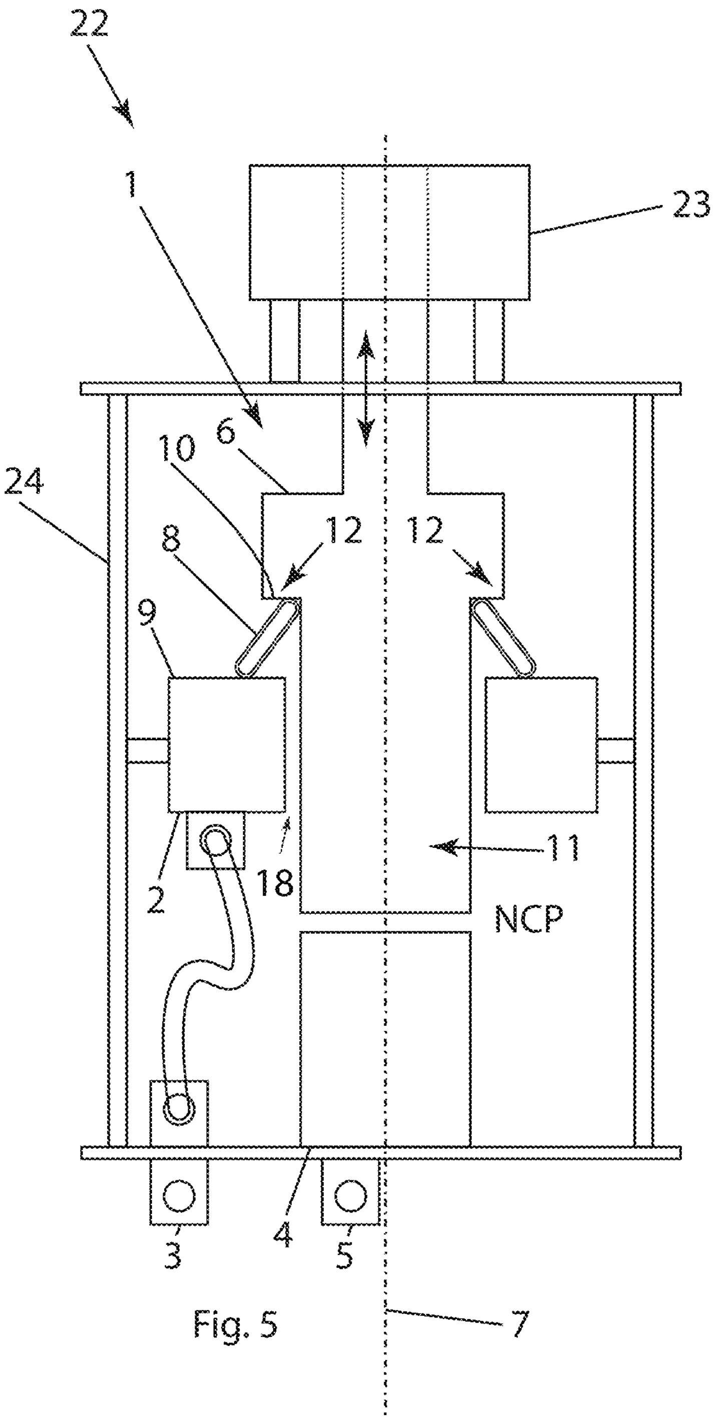
FIG. 5 shows a vacuum interrupter comprising an embodiment of an electrical breaker similar to the electrical breaker portion of the contact assembly of FIGS. 1-4 indicated in FIG. 2 with broken line referred to with reference numeral 20. However, the contact assembly 1 in the vacuum interrupter uses another embodiment of the fourth switching means corresponding to the embodiment shown in FIG. 10.
Figure 6:
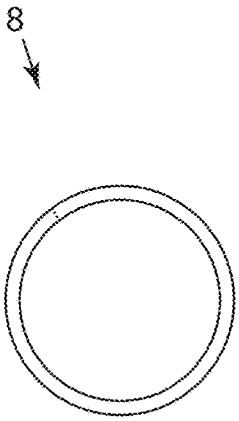
FIGS. 6-9 show schematic views of four different embodiments of a cross-sectional shape of a ring used as the fourth contact member.

In some embodiments, such as the ones shown in FIGS. 4 and 5, the third contact member 6 comprises a protrusion 11 surrounded by a circumferential shelf 12 forming the second abutment surface 10, wherein the fourth contact member 8 is a ring arranged around the protrusion 11. Other features of these embodiment are similar to the ones of the embodiment of FIGS. 1-3.

The ring rests on the circumferential shelf 12 when biased between the first contact member 2 and the third contact member 6 and the provision of the fourth contact member 8 in the form of a ring around a protrusion 11 provides for improved positioning of the fourth contact member 8 and an even loading and deformation of the contact member as the third contact member 6 moves relatively the first contact member 2.

The ring is a closed ring, but may in other embodiments alternatively be replaced by an open ring, i.e., a ring having two free ends and a gap between the free ends. Although the ring could be formed with a gap, i.e., not a closed ring, it is advantageous to provide a closed ring, since it improves distribution of force around the ring at compression of the ring, and promotes uniform deformation of the ring, thus reducing tendency of gliding motion between the ring and the first and second abutment surface 10, respectively, since the closed ring has no free ends.

The ring comprises a coil spring.

The provision of a ring in the form of a coil spring provides a high number of points or regions of contact between the ring the first and second abutment surface 10, respectively. The provision of more contact points/regions reduces the risk of poor electric contact and reduces the risk of local arcing, thus reducing wear and contamination of the contact assembly 1.

The coil spring comprises a wire formed to windings wound such that the coil spring has a cross section with a cross-sectional shape.

Figure 10:
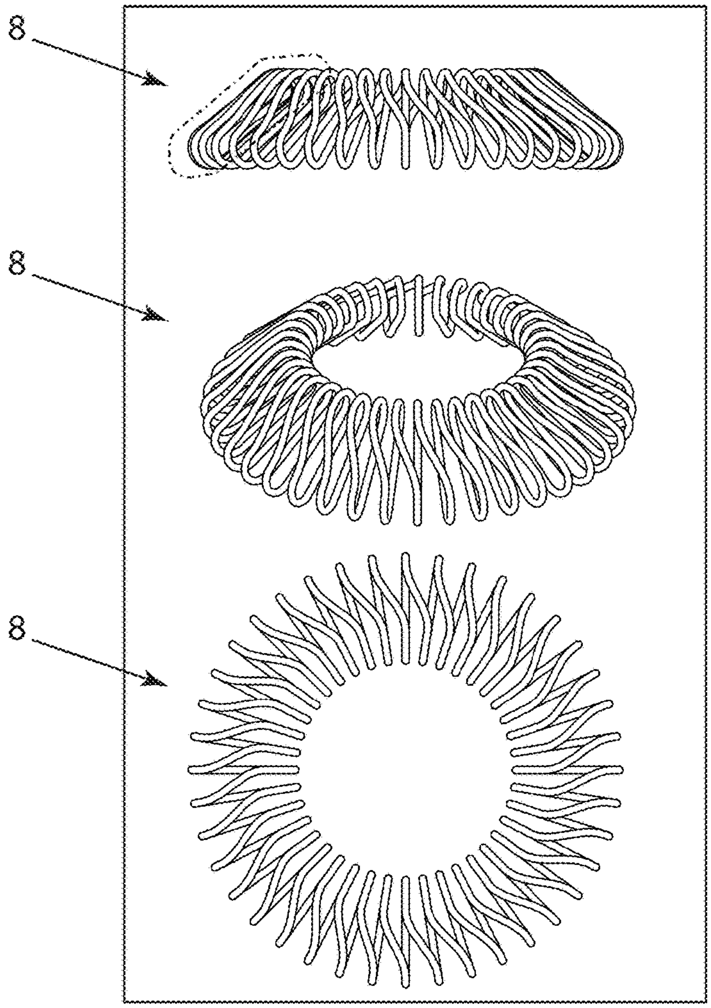
FIG. 10 specifically shows different views of a ring having a cross-sectional shape similar to the one shown in FIG. 8.

The hollow inner space of the coil spring allows the coil spring to be compressed in a normal direction relative to a central path (shown with broken lines in the lower view of FIG. 10) along which the coil spring is wound at manufacturing of the coil spring.

The cross-sectional shape of the coil spring may be any suitable shape and some alternative shapes are shown in FIGS. 6-9.

As shown in FIGS. 7-10, the cross-sectional shape of those embodiments provide the coil spring with a first ridge portion 16 facing the first abutment surface 9, and a second ridge portion 17 facing the second abutments surface.

The first ridge portion 16 is radially offset from said second ridge portion 17 with respect to the first longitudinal axis 7.

The radial offset between the first ridge portion 16 and the second ridge position makes it easier to deform the fourth contact member 8 due to an increased momentum on each winding caused by the radial offset.

In other words, the coil spring may comprise a wire formed to windings wound a such that the coil spring has a substantially rhomboid cross-sectional shape with rounded corners. The rhomboid cross-sectional shape provides substantially straight portions of wire of each winding. The substantially straight portions enable a greater contact surface between the abutment surfaces and therefore reduces the risk of poor electric contact and reduces the risk of local arcing, thus reducing wear and contamination of the contact assembly 1. The rhomboid cross-sectional shape enables easier deformation of the fourth contact member 8.

Figure 7:
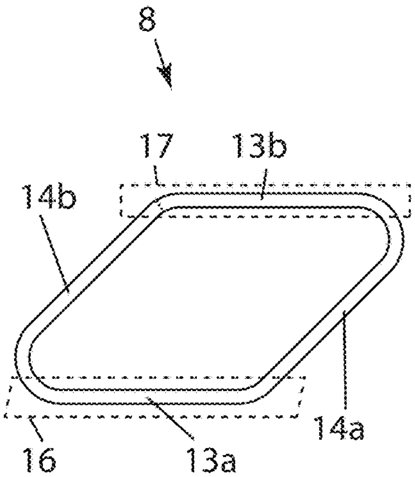
Figure 8:
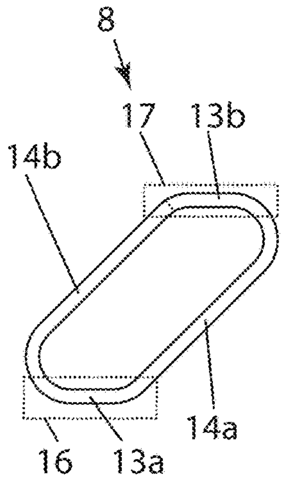
Figure 9:
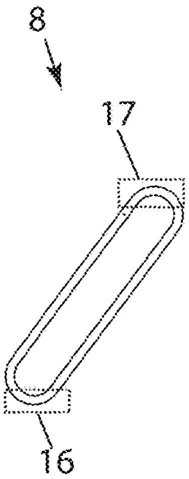

As for example shown in FIG. 7, Each winding may thus comprise two substantially straight parallel first wire portions 13*a*, 13*b*, and two substantially straight parallel second wire portions 14*a*, 14*b* inclined relatively the first wire portions 13*a*, 13*b*, said first wire portions 13*a*, 13*b* facing the first abutment surface 9 and the second abutment surface 10, respectively.

If the contact assembly is to be used as an electrical switch 21, the contact assembly 1 may further comprise a fifth contact member 15 electrically connected to a third electrical terminal 19 (see the embodiments of FIGS. 1-4). The third contact member 6 is movable along said first longitudinal axis 7 away from said first contacting position CP1 a second predetermined distance D2 past the non-contacting position NPC to a second contacting position CP2 in which the third contact member 6 physically contacts the fifth contact member 15. The fourth contact member 8 is biased between the first contact member 2 and the third contact member 6 through the whole range of movement from the first contacting position CP1 to the second contacting position CP2.

As shown in FIGS. 4 and 5, the first contact member 2 may comprise a cylindrical body with a central through opening 18. As also shown in FIGS. 4 and 5, the third contact member 6 may comprise a protrusion 11 extending through the central through opening 18 of the first contact member 2.

It is suggested to provide an electrical circuit breaker comprising the above-described contact assembly 1.

Further, it is suggested to provide an electrical circuit maker comprising the above-described contact assembly 1. Also, it is suggested to provide an electrical switch comprising the above-described contact assembly 1 comprising the fifth contact member 15.

Further, it is suggested to provide a vacuum interrupter 22 comprising an electrical circuit breaker 20 according to the above-described embodiments of the contact assembly 1. An exemplary embodiment of such a vacuum interrupter 22 is schematically shown in FIG. 5. The vacuum interrupter 22 comprises a housing 24 and the third contact member 6 comprises a portion extending through an opening of the housing. The vacuum interrupter comprises sealing means (not illustrated) for gas-tight sealing between the housing 24 and the third contact member 6 such that the vacuum inside the housing 24 can be kept over time whilst allowing an actuator 23 attached to the housing 24 on an outside of the housing 24 to control movement of the third contact member 6 along said first longitudinal axis 7. In other embodiments, the actuator could alternatively be provided inside the housing 24 wherein the third contact member would not need to extend through an opening of the housing. In yet an embodiment, the actuator 23 could be omitted, wherein the third contact member 6 is instead manually operated. The first electrical terminal 3 and the second electrical terminal 5 are configured such that they are accessible from the outside of the housing 24. The first electrical terminal 3 is electrically connected to the first contact member 2 by an electrical cable, although any other means for providing electrical contact between the first contact member 2 and the first electrical terminal 3 could be used instead. For example, the first electrical terminal 3 could be integrally formed with the first contact member 2 or attached directly to the first contact member 2. The first contact member 2 and the second contact member 4 are fixed to the housing 24. As discussed above, the fourth member 8 comprises the coil spring shown in FIG. 10. The coil spring has a cross-sectional shape providing a first ridge portion 16 facing the first abutment surface 9, and a second ridge portion 17 facing the second abutments surface 10. The first ridge portion 16 is radially offset from said second ridge portion 17 with respect to the first longitudinal axis 7.

Table of reference numerals

| | |
|---|---|
| 1 | contact assembly |
| 2 | first contact member |
| 3 | first electrical terminal |
| 4 | second contact member |
| 5 | second electrical terminal |
| 6 | third contact member |
| 7 | first longitudinal axis |
| 8 | fourth contact member |
| 9 | first abutment surface |
| 10 | second abutment surface |
| 11 | protrusion |
| 12 | circumferential shelf |
| 13a, 13b | first wire portions |
| 14a, 14b | second wire portions |
| 15 | fifth contact member |
| 16 | first ridge portion |
| 17 | second ridge portion |
| 18 | central through opening |
| 19 | third electrical terminal |
| 20 | electrical circuit breaker |
| 21 | electrical switch |
| 22 | vacuum interrupter |
| 23 | actuator |
| 24 | housing |
| CP1 | first contacting position |
| CP2 | second contacting position |
| D1 | first predetermined distance |
| D2 | second predetermined distance |
| NCP | non-contacting position |

The invention claimed is:

1. A contact assembly for an electrical circuit breaker, for an electrical circuit maker, or for an electrical switch, said contact assembly comprising:

a first contact member electrically connected to a first electrical terminal by means of an electrical cable, by the first contact member being integrally formed with the first electrical terminal or by the first contact member being directly connected to the first electrical terminal, a second contact member electrically connected to a second electrical terminal, a third contact member guided for movement along a first longitudinal axis between at least a first contacting position in which the third contact member physically contacts the second contact member, and a non-contacting position in which the third contact member is physically spaced apart from the second contact member by movement of the third contact member a first predetermined distance along the first longitudinal axis away from the first contacting position, said contact assembly further comprising an elastically deformable and electrically conductive fourth contact member provided between a first abutment surface of the first contact member and a second abutment surface of the third contact member, wherein the first abutment surface and the second abutment surface are configured such that a distance between the first abutment surface and the second abutment surface increases when the third contact member is moved in a direction along the first longitudinal axis away from the second contact member, and such that the distance between the first abutment surface and the second abutment surface decreases when the third contact member is moved in a direction towards the second contact member, and wherein the fourth contact member is configured such that the fourth contact member physically contacts both the first abutment surface and the second abutment surface at least when the third contact member is in the first contacting position.

2. The contact assembly according to claim 1, wherein the third contact member comprises a protrusion surrounded by a circumferential shelf forming the second abutment surface, wherein the fourth contact member is a ring arranged around the protrusion.

3. The contact assembly according to claim 2, wherein the ring is a closed ring.

4. The contact assembly according to claim 2, wherein the ring comprises a coil spring.

5. The contact assembly according to claim 4, wherein the coil spring comprises a wire formed to windings wound such that the coil spring has a cross section with a first ridge portion facing the first abutment surface, and a second ridge portion facing the second abutments surface, said first ridge portion being radially offset from said second ridge portion with respect to the first longitudinal axis.

6. The contact assembly according to claim 4, wherein the coil spring comprises a wire formed to windings wound such that the coil spring has a substantially rhomboid cross-sectional shape with rounded corners.

7. The contact assembly according to claim 4, wherein each winding comprises two substantially straight parallel first wire portions, and two substantially straight parallel second wire portions inclined relatively the first wire portions, said first wire portions facing the first abutment surface and the second abutment surface, respectively.

8. The contact assembly according to claim 1, further comprising a fifth contact member electrically connected to a third electrical terminal, wherein the third contact member is movable along said first longitudinal axis away from said first contacting position a second predetermined distance past the non-contacting position to a second contacting position in which the third contact member physically contacts the fifth contact member, said fourth contact member being biased between the first contact member and the third contact member through a whole range of movement from the first contacting position to the second contacting position.

9. An electrical switch comprising the contact assembly according to claim 8, or an electrical circuit breaker comprising the contact assembly according to claim 8, or an electrical circuit maker comprising the contact assembly according to claim 8.

10. A vacuum interrupter comprising the electrical circuit breaker according to claim 9.

11. The contact assembly according to claim 1, wherein the first contact member comprises a cylindrical body with a central through opening, and wherein the third contact member comprises a protrusion extending through the central through opening of the first contact member.

* * * * *